(12) United States Patent
Manikutty et al.

(10) Patent No.: US 7,305,414 B2
(45) Date of Patent: Dec. 4, 2007

(54) TECHNIQUES FOR EFFICIENT INTEGRATION OF TEXT SEARCHING WITH QUERIES OVER XML DATA

(75) Inventors: Anand Manikutty, Foster City, CA (US); Muralidhar Krishnaprasad, Fremont, CA (US); Zhen Hua Liu, San Mateo, CA (US); James Warner, Mountain View, CA (US); Rohan Angrish, Redwood City, CA (US); Vikas Arora, San Francisco, CA (US); Susan Kotsovolos, San Carlos, CA (US); Ravi Murthy, Fremont, CA (US); Wesley Lin, West Covina, CA (US)

(73) Assignee: Oracle International Corporation, Redwood Shores, CA (US)

( * ) Notice: Subject to any disclaimer, the term of this patent is extended or adjusted under 35 U.S.C. 154(b) by 462 days.

(21) Appl. No.: 11/099,918

(22) Filed: Apr. 5, 2005

(65) Prior Publication Data

US 2006/0224627 A1    Oct. 5, 2006

(51) Int. Cl.
*G06F 17/30* (2006.01)
(52) U.S. Cl. ...................................... 707/102
(58) Field of Classification Search .................... 707/4, 707/10, 102, 104.1; 709/217
See application file for complete search history.

(56) References Cited

U.S. PATENT DOCUMENTS

| | | | |
|---|---|---|---|
| 5,404,513 | A | 4/1995 | Powers et al. |
| 5,974,407 | A | 10/1999 | Sacks |
| 6,055,544 | A | 4/2000 | DeRose et al. |
| 6,128,610 | A | 10/2000 | Srinivasan et al. |
| 6,141,655 | A | 10/2000 | Johnson et al. |
| 6,208,993 | B1 | 3/2001 | Shadmone |
| 6,470,344 | B1 | 10/2002 | Kothuri et al. |
| 6,487,546 | B1 | 11/2002 | Witkowski |
| 6,496,842 | B1 | 12/2002 | Lyness |
| 6,708,186 | B1 | 3/2004 | Claborn et al. |
| 6,836,778 | B2 | 12/2004 | Manikutty et al. |
| 7,031,956 | B1 | 4/2006 | Lee et al. |
| 2002/0073019 | A1 | 6/2002 | Deaton |
| 2002/0116457 | A1 | 8/2002 | Eshleman et al. |
| 2003/0009361 | A1 | 1/2003 | Hancock et al. |
| 2003/0065659 | A1 | 4/2003 | Agarwal et al. |

(Continued)

OTHER PUBLICATIONS

U.S. Appl. No. 10/944,171, filed Sep. 16, 2005.

(Continued)

*Primary Examiner*—Etienne Leroux
(74) *Attorney, Agent, or Firm*—Hickman Palermo Truong & Becker LLP

(57) ABSTRACT

A method and apparatus for rewriting a database command containing an embedded XML expression such that the rewritten database command recites a text function, in lieu of the embedded XML expression, is provided. Advantageously, a DBMS may take advantage of the efficiencies in storing XML data within the database, while avoiding the generation of unnecessary XML elements in processing the query when the XML elements contribute nothing to the outcome of the query. Cost-base or rule-based analysis may be performed to determine how to rewrite a received database command. The database server may functionally evaluate the text function or may use an index defined on a column of the database. The text function may function as a primary filter or may reference a column upon which an index is defined, wherein the index operates at the same or higher level than a column being referenced in the embedded XML expression.

28 Claims, 3 Drawing Sheets

U.S. PATENT DOCUMENTS

| | | |
|---|---|---|
| 2003/0140308 A1 | 7/2003 | Murthy et al. |
| 2004/0064466 A1 | 4/2004 | Manikutty et al. |
| 2004/0088415 A1 | 5/2004 | Chandrasekar et al. |
| 2004/0148278 A1 | 7/2004 | Milo et al. |
| 2004/0220912 A1 | 11/2004 | Manikutty et al. |
| 2004/0220927 A1 | 11/2004 | Murthy et al. |
| 2004/0230667 A1 | 11/2004 | Wookey |
| 2004/0267760 A1 | 12/2004 | Brundage et al. |
| 2005/0010896 A1 | 1/2005 | Meliksetian et al. |
| 2005/0289125 A1 | 12/2005 | Liu et al. |

OTHER PUBLICATIONS

U.S. Appl. No. 11/034,490, filed Jan. 12, 2005.

Cheng, Josephine, et al., "IBM DB2 XML Extender, An end-to-end solution for storing and retrieving XML documents," IEEE, ICDE '00 Conference, San Diego, Feb. 2000, 128 pages. (Copy of Reference provided on CD-ROM).

Dayen, I., "Storing XML in Relational Databases", *XML.com* XP-002275971(1998-2004) pp. 1-13. (Copy of Reference provided on CD-ROM).

Funderbunk, J. et al., "XML programming with SQL/XML and XQuery", *IBM Systems Journal* XP-002295973 (2002) pp. 642-665. (Copy of Reference provided on CD-ROM).

Hierarchical Queries, XP-002295972, pp. 8-3 to 8-7. (Copy of Reference provided on CD-ROM).

Melton, Jim, "ISO-ANSI Working Draft, XML-Related Specifications (SQL/XML)," WG3: DRS-020, H2-2002-365, Aug. 2002, 154 pages. (Copy of Reference provided on CD-ROM).

Oracle Corporation, "Oracle9*i* XML Database Developer's Guide—Oracle XML DB," Release 2 (9.2), Mar. 2002, Part No. A96620-1, pp. 5-8-5-10, 5-21,5-21-5-24, 5-52-5-70, 10-5-10-20, and 11-1-11-20. (Copy of Reference provided on CD-ROM).

PCT/US2004/010018—International Search Report and Written Opinion (14 pages) (Copy of Reference provided on CD-ROM).

PCT/US2004/010018—current claims. (Copy of Reference provided on CD-ROM).

Peng, Feng et al., "Xpath queries on streaming data," 2003, ACM Press, pp. 321-442. (Copy of Reference provided on CD-ROM).

Vio Dury, Jean-Yes, "Xpath on left and right sides of rules: toward compact XML tree rewriting through node patterns," 2003, ACM Press, pp. 19-25. (Copy of Reference provided on CD-ROM).

W3C, "XML Schema Part 1: Structures," W3C Recommendation, May 2, 2001, http://www.w3.org/TR/2001/REC-xmlschema-1-20010502/, pp. 1-203. (Copy of Reference provided on CD-ROM).

W3C, "XML Schema Part 2: Datatypes," W3C Recommendation, May 2, 2001, http://www.w3.org/TR/2001/REC-xmlschema-2-20010502/, pp. 1-146, (Copy of Reference provided on CD-ROM).

TECHNIQUES FOR EFFICIENT INTEGRATION OF TEXT SEARCHING WITH QUERIES OVER XML DATA

RELATED APPLICATION DATA

This application is related to U.S. patent Ser. No. 10/428,878, entitled "Techniques for Rewriting XML Queries Directed to Relational Database Constructs," filed on May 1, 2003, by Anand Manikutty et al., hereafter referred to as the "query rewrite patent," the contents of which are herein incorporated by reference as if originally set forth herein.

FIELD OF THE INVENTION

The present invention generally relates to the performance of text searches of XML documents, and more particularly relates to performing searches, using SQL commands containing XML expressions, for XML documents stored within a database.

BACKGROUND

For a variety of reasons, it is advantageous to store XML documents within a database. An XML document is a document that conforms to the XML standard. An XML document is typically composed of a set of nodes arranged in a hierarchy. Each node of a XML document may be composed of a set of one or more tags, and each node may have a set of associated attributes. A node may also be associated with a portion of the text of the XML document.

Once a set of XML documents are stored within a database, it would be advantageous to use an XML query language to retrieve, from the database, those XML documents that match a set of search criteria. An XML query language is a language that allows an operation, such as a search, to be performed on one or more XML documents, to be expressed. Illustrative examples of an XML query language are XPath and XQuery. To support the demand of retrieving and storing XML data to and from relational databases, an industry standard (SQL/XML) has been developed to allow SQL to operate on XML.

An SQL/XML query may include XPath based operation, such as EXTRACT, EXISTNODE, and EXTRACTVALUE, which operate on a portion of an XML document indicated by an XPath expression provided as an argument to the operator. EXISTNODE returns one value (e.g., 0) if there is no XML element at the position in the hierarchy indicated by the XPath expression, and a different value (e.g., 1) otherwise. EXTRACT returns a data stream representing a portion of the XML document that include and descend from the XML element or elements indicated by the XPath expression. EXTRACTVALUE returns a scalar value, if any, from the XML element indicated by the XPath expression.

When a SQL command contains an XML expression, prior to executing the SQL command, the DBMS may convert data, stored within the DBMS, to an XML form, and send the XML form of the converted data to the process that implements the XPath operation. The XPath operation process parses the data to identify and return the indicated information. This process can be wasteful if only a portion of the converted data, stored separately in one or more columns of a relational or object-relational database, affects the results. It would be desirable to extract only data from the columns of interest with an SQL query. In addition, the use of an SQL query enables further SQL optimizations that fully exploit the object-relational storage. Such optimization may not be available during parsing by an XPath operation.

Based on the foregoing, there is a clear need for a mechanism to rewrite a query containing an XML expression, directed to an XML type object-relational construct, as a SQL query.

Techniques for retrieving XML documents, which are stored in a database, using a database command, containing an embedded XML query language expression, are disclosed in the query rewrite patent (identified above in the section entitled Related Application Data). According to these techniques, a determination is made as to whether an embedded XML query language expression in a received database command may be transformed (rewritten) into a database operation. If it is determined that the embedded XML query language expression can be transformed, then the embedded XML query language expression is rewritten to be expressed as a database operation that does not involve the embedded XML query language expression.

While these techniques enable certain database commands containing embedded XML expressions to be processed more efficiently by the DBMS, these techniques do not address the problem of transforming database commands containing embedded XML expressions, when the embedded XML expressions define a search for a set of XML documents that match a set of specified search criteria.

Consequently, what is needed is an approach for performing the efficient integration of full-text searching, using an XML expression, of XML documents, stored within a database, with query rewriting techniques. The approaches described in this section are (a) approaches that could be pursued, but not necessarily approaches that have been previously conceived or pursued, or (b) approaches that have been developed either by the inventors of the present application or internally within the assignee of the present application. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that embodiments of the present invention may be practiced without these specific details. In other instances, well-known structures and devices are shown in block diagram form in order to avoid unnecessarily obscuring the description of the embodiments of the invention presented herein.

Functional Overview

Techniques are disclosed herein that allow a database command, such as a SQL statement, that contains an embedded XML expression to be rewritten such that the database command recites a full-text function in lieu of the embedded XML expression. The embedded XML expression may specify search criteria for retrieving a set of XML documents. The search criteria may include (a) a path that identifies one or more locations within an XML document, and (b) search criteria for filtering the one or more locations based on content contained within the one or more locations. Advantageously, the DBMS may take advantage of the efficiencies in storing XML data within the database, while avoiding the generation of unnecessary XML elements when processing the database command when the XML elements contribute nothing to the outcome. As a result, the performance of processing the database command is greatly enhanced.

Cost-base or rule-based analysis may be performed to determine how to rewrite a database command. For example, an embedded XML expression within a received SQL statement may be rewritten as a full-text function. The full-text function may be functionally evaluated or may make use of an index defined on a column of the database. Alternately, the cost-base or rule-based analysis may determine not to rewrite the embedded XML expression in favor of processing the original database command containing the embedded XML expression.

As described in further detail below, the embedded XML expression may be rewritten as a variety of database functions, assuming the prerequisites for rewriting the embedded XML expression as that database function are met. Also, the embedded XML expression may be rewritten as a database function that references a column upon which an index is defined. The index may operate at the same level, or at a higher level, than the column being referenced in the embedded XML expression. Further, the embedded XML expression may be rewritten as a database function that operates as a primary filter. Each of these techniques greatly enhances the efficiency in processing database commands that contain embedded XML expressions. These and other additional techniques shall be described in further detail below.

Architectural Overview

Figure 1:
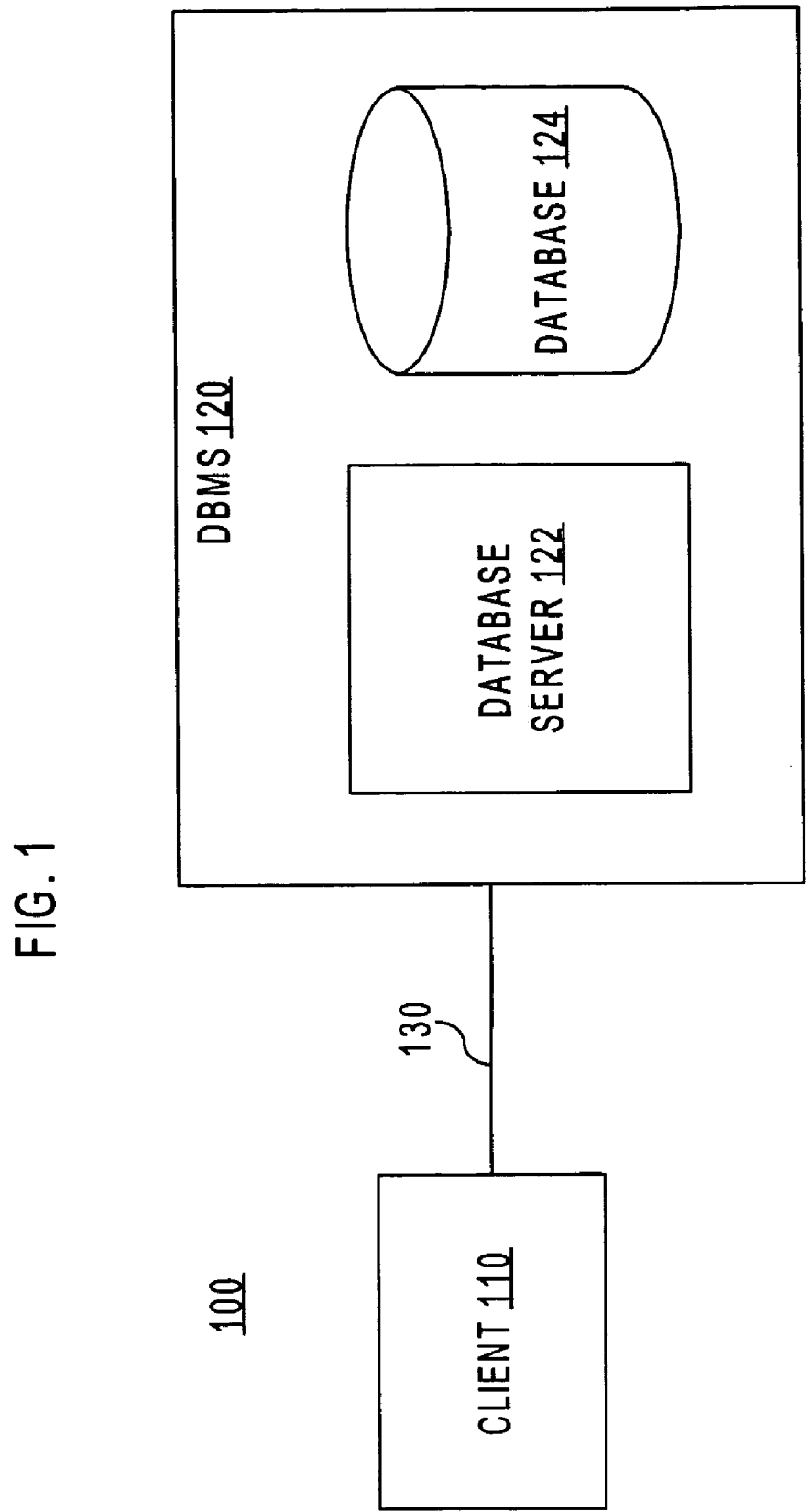
FIG. 1 is a block diagram of a system according to an embodiment of the invention.

FIG. 1 is a block diagram of a system 100 according to an embodiment of the invention. System 100 may be used to efficiently retrieve XML documents stored within a database by processing database commands containing embedded XML expressions. In an embodiment of the invention, system 100 comprises a client 110, a database management system (DBMS) 120, and a communications link 130.

A client, such as client 110, may be any process that executes on a computer and interacts with DBMS 120. A client may transmit, to DBMS 120, a database command, to retrieve one or more XML documents that satisfy a set of search criteria specified in the database command. An illustrative example of a database command is a SQL statement. The database command may contain an embedded XML expression, such as an expression specified in an XML query language. While only one client is depicted in FIG. 1, system 100 may comprise any number of clients. Client 110 may execute applications on a computer interconnected to DBMS 120 via communications link 130.

A DBMS, such as DBMS 120, refers to any functional component capable of persistently storing electronic data. An illustrative example of DBMS 120 is Oracle 10 g, available from Oracle Corporation, of Redwood Shores, Calif.

A DBMS includes a database server and a database. A database server, such as database server 122, refers to any functional component capable of processing database commands received from client 110. For example, database server 122 may perform one or more steps of FIG. 2. A database, such as database 124, refers to any medium for persistently storing data. Database 124 may be used to persistently store one or more XML documents.

Communications link 130 may be implemented by any medium or mechanism that provides for the exchange of data between client 110 and DBMS 120. Examples of communications link 130 include, without limitation, a network such as a Local Area Network (LAN), Wide Area Network (WAN), Ethernet or the Internet, or one or more terrestrial, satellite or wireless links.

Having described an architecture upon which embodiments of the invention may be implemented, the steps performed by an embodiment of the invention in performing full-text searching shall now be described.

Performing Full-Text XML Searches on XML Documents Stored in a Database

Figure 2:
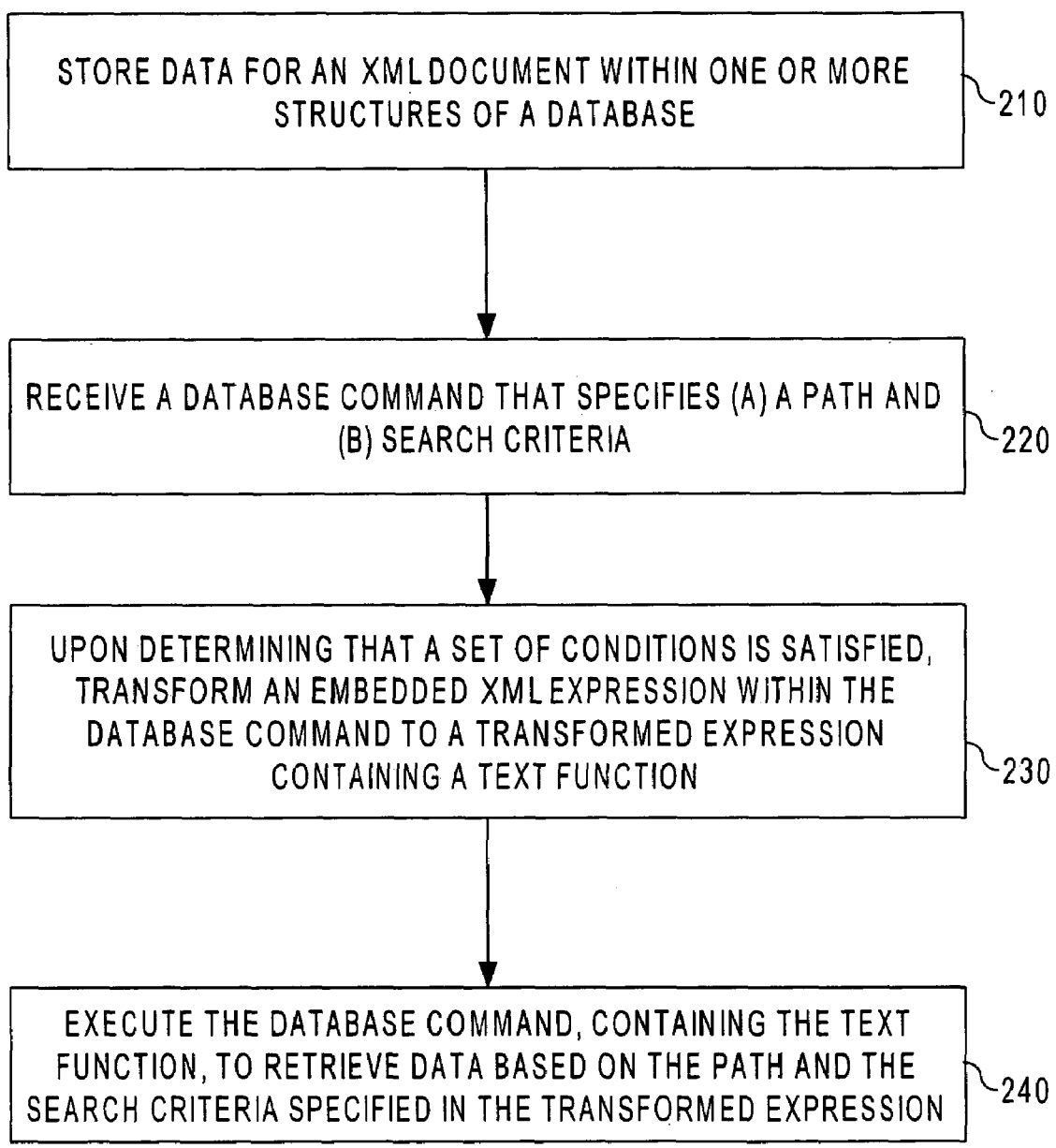
FIG. 2 is a flowchart illustrating the functional steps of performing a full-text search according to an embodiment of the invention.

By performing the functional steps of FIG. 2, embodiments of the invention advantageously allow clients 110 to retrieve XML documents stored within database 124 by issuing database commands containing embedded XML expressions with greater speed and efficiency than prior approaches. In an embodiment, database server 122 may perform the steps of FIG. 2.

Initially, in step 210, data for an XML document is stored within one or more structures of a database. For example, step 210 may be performed by storing one or more XML documents within one or more tables of database 124. An XML document may be stored in a "decomposed" manner, wherein data for the different nodes of the XML document may be stored in different columns across one or more tables. After data for an XML document is stored within one or more relational structures of a database, processing proceeds to step 220.

In step 220, a database command, containing an embedded XML expression, is received. In an embodiment, the database command received in step 220 may be sent by client 110 and received by database server 122 over communications link 130.

In an embodiment, the embedded XML expression within the database command may specify (a) a path that identifies one or more locations within the structure of an XML document, and (b) search criteria for filtering the identified locations based on content contained within the identified locations. For example, the embedded XML expression within the database command may be made for purposes of retrieving a set of XML documents, stored within database 124, that satisfy a set of search criteria.

Several examples of database commands that may be received in step 220 shall be discussed in further detail below.

Illustrative Database Commands Containing an Embedded XML Expression

A database command, containing an embedded XML expression, which specifies a search for a set of XML documents that meet a set of search criteria, may be recited in a variety of formats. For example, the database command may be, but need not be, expressed in SQL. The embedded XML expression within the database command may be expressed in any XML query language, such as XPath or XQuery.

The embedded XML expression may include a function that includes a namespace prefix. A namespace, often identified using a prefix, are useful to identify a set of related commands and to avoid name collision. For example, to add the function 'add' in the namespace XYZ, the following format may be used: xyz:add.

As commonly understood by those in the art, a function may be added to a particular namespace by configuring an XML Query Processor to recognize and process the function. For example, to add the function 'add' to the namespace XYZ, the XML Query Processor must be configured to recognized the function xyz:add, and to perform the functionality associated with the add function. XML Query Processors are described in further detail in the query rewrite patent.

Having presented an overview of the structure of database commands, embedded XML expressions, and namespaces, several illustrative functions that may be contained within an embedded XML expression shall be discussed below.

Nsp:contains XPath Function

An XPath function may be used in any context where XPath functions can be used. XPath functions shall be discussed herein with reference to an illustrative XPath function, the nsp:contains function. An XPath expression that includes the nsp:contains function can be used in any context where an XPath expression can be used. The nsp:contains function may be used in SQL functions that have an XPath expression as an argument. Illustrative SQL functions having an XPath expression as an argument include existsNode, extract, and extractValue. The nsp:contains XPath function has the following signature:

number nsp:contains(input_text nodeset, $text_query as string [,
$policy_name as
string [, $policy_owner as string]])

The nsp:contains XPath function may be used to restrict the result set to those XML documents (identified by the input_text argument) that match the specified search criteria (identified in the text_query argument). The nsp:contains XPath function returns a number or integer as the return value, which indicates the degree of the match. A value of zero is returned if there is no match. Also, the input_text argument evaluates to a single text node or attribute.

Nsp:contains XQuery Function

XQuery functions may be used in any context where XQuery functions can be used. XQuery functions shall be discussed herein with reference to an illustrative XQuery function, the nsp:contains function. For ease of explanation, the illustrative XQuery function shall have the same name as the illustrative Xpath function discussed above (although these functions are merely illustrative, and may have any name or signature). An XQuery expression that includes the nsp:contains function can be used in any context where an XQuery expression can be used. The nsp:contains function may be used in SQL functions that take an XQuery expression as an argument. Illustrative SQL functions having an XQuery expression as an argument include XMLQuery and XMLTable. The nsp:contains XQuery function has the following signature:

nsp:contains($input_text as node( )*, $text_query as xs:string [,
$policy_name as
xs:string [, $policy_owner as xs:string]]) as xs:integer The nsp:contains XQuery function may be used to restrict the result set to those XML documents (identified by the input_text argument) that match the specified search criteria (identified by the text_query argument). The nsp:contains XQuery function returns a number or integer as the return value, which indicates the degree of the match. A value of zero is returned if there is no match. Also, the input_text argument evaluates to a single text node or attribute.

The name of the nsp:contains XPath function and the nsp:contains XQuery function includes a name ("contains") plus a namespace prefix ("nsp:"). Thus, when using nsp: contains with the existsNode function, the extract function, or the extractValue function, the namespace mapping parameter must be supplied. An illustrative namespace mapping parameter is:

xmlns:nsp="http://xmlns.namespace.com/xdb"

To illustrate, the following example shows how the namespace prefix may be supplied in an embodiment:

SELECT id FROM po_tab
WHERE existsNode(doc, '/purchaseOrder/comment[nsp:contains(text( ),
"($beaches and whales) OR giraffes") > 0)',
'xmlns:nsp="http://xmlns.company.com/xdb"') = 1;

The syntax and the semantics of the text_query argument in the nsp:contains XPath function and the nsp:contains XQuery function may be structured in any way. For convenience, the text_query argument may be structured in a manner that corresponds to other XML query function or database query language function arguments. For example, in an embodiment, the syntax and the semantics of the text_query argument in the nsp:contains XPath function and the nsp:contains XQuery function are the same as the text_query argument in the CONTAINS database query language function, with two differences. The first difference is that nsp:contains text_query argument must not include the structure operators WITHIN, INPATH, or HASPATH. The second difference is that the text_query argument may include the score weighting operator weight(*), but weights will be ignored.

The above illustrated XPath and XQuery functions are merely illustrative of several functions that may be contained within the embedded XML expressions contained within a database command received in step 220 according to embodiments of the invention. Numerous other XML functions may be contained within the embedded XML expression portion of a database command other than those functions discussed above, which are merely illustrative. After the database command containing the embedded XML expression is received in step 220, processing proceeds to step 230.

Transformation the Embedded XML Expression within a Database Command

In step 230, upon determining that a set of conditions is satisfied, the embedded XML expression within the database command of step 220 is transformed to a full-text function. The performance of step 230 is elaborated in detail in the following sections.

Embodiments of the invention may advantageously transform the embedded XML expression within a received database command to a full-text function. Techniques for transforming queries from being expressed in an XML query language to being expressed in a database query language are discussed in the query rewrite patent. The query rewrite patent discusses techniques for transforming XPath queries from being expressed in an XML query language to being expressed in a database query language (in a process referred to as "XPath query rewrite") and techniques for transforming XQuery queries from being expressed in an XML query language to being expressed in a database query language (in a process referred to as "XQuery query rewrite").

Generally, to transform the embedded XML expression within a received database command to a full-text function, the portion of the embedded XML expression which includes an XPath function (such as the nsp:contains XPath function) is performed via XPath query rewrite, and the portion of the embedded XML expression which includes an XQuery function (such as the nsp:contains XQuery function) is performed via XQuery query rewrite. Further details and description of transforming embedded XML expressions into full-text functions is provided below.

Cost-Based Decisions

The decision of how to transform the embedded XML expression within the database command may be based on a cost-based or a rule-based scheme. For example, rules may be stored at or accessible to database server 122 that instructs the database server 122 on how to transform the embedded XML expression in step 230. Also, the decision on how to transform the embedded XML expression within the database command may be based on a set of costs associated with each option available. For example, by consulting a set of rules or a set of costs, database server 122 may determine (a) not to transform the transform the embedded XML expression within the database command at all, (b) may determine that the embedded XML expression should be rewritten to a full-text function that is functionally evaluated, or (c) may determine that the embedded XML expression should be rewritten to a full-text function that uses an index when being evaluated.

A full-text function may be functionally evaluated in a variety of ways. For example, a full-text function may be functionally evaluated by dynamically constructing an index in memory based upon the evaluation of the function. Of course, exactly how a function is functionally evaluated depends upon the nature of the function.

A cost-based or rule-based scheme for determining how to transform the embedded XML expression within the database command may be used in conjunction with any manner of transforming the embedded XML expression into a full-text function.

Transforming the Embedded XML Expression to a Full-Text Function to be Functionally Evaluated In step 230, the embedded XML expression within the database command may be transformed to a full-text function that is functionally evaluated. For example, the embedded XML expression may be rewritten using the SQL function, such as XCONTAINS.

The XCONTAINS operator is a predicate that may be used in a SQL statement. The XCONTAINS operator has the following signature:

XCONTAINS(column,expresssion)

Where 'column' refers to a column, and 'expression' refers to a XPATH expression. If an index is defined upon the column referenced in the XCONTAINS function, then the index will be used when evaluating the function; however, if an index is not defined upon the column referenced in the XCONTAINS functions, then the function will be evaluated functionally. Consider the following example:

EXAMPLE 1

```
SELECT ID
FROM PURCHASE_ORDERS_xmltype
WHERE existsNode( DOC,
'/purchaseOrder/Address/comment[nsp:contains(text( ),
"$beaches and whales OR giraffes")>0]',
'xmlns:nsp="http://xmlns.company.com/xdb"' ) = 1 ;
```

This query may be rewritten into the following object-relational query:

EXAMPLE 2

```
SELECT ID
FROM PURCHASE_ORDERS_xmltype
WHERE XCONTAINS(DOC.ADDRESS.COMMENT, '$beaches and
whales OR giraffes') > 0;
```

If an index is not defined on the column identified by "DOC.ADDRESS.COMMENT," then the full-text function of Example 2 will be evaluated functionally. As explained below, if an index is defined on a column referenced in the embedded XML expression, then it may be used in evaluating the transformed embedded XML expression.

Transforming the Embedded XML Expression to a Full-Text Function to be Evaluated Using an Index The embedded XML expression containing an XML query function may also be transformed into a full-text function that is evaluated using an index if (a) the XML query function is directed against a table or view storing or presenting data for an XML document, or if the XML query function is over a XML view presenting data for an XML document, and (b) the embedded XML expression references a column upon which an index is defined. These circumstances may happen according to the discussion in the query rewrite patent application. The transformed embedded XML expression may use the SQL function XCONTAINS to perform the text search.

Consider the following illustrative query containing an embedded XML expression:

EXAMPLE 3

```
SELECT ID
FROM PURCHASE_ORDERS_xmltype
WHERE existsNode( DOC,
'/purchaseOrder/Address/comment[nsp:contains(text( ),
"$beaches and whales OR giraffes")>0]',
'xmlns:nsp="http://xmlns.company.com/xdb"' ) = 1 ;
```

The query of Example 3, when executed, returns data from the ID column of the database object PURCHASE_ORDERS_xmltype for those records that match the specified search condition. In this case, any record that satisfies the search condition is a XML document that contains a hierarchy of nodes that includes a purcharseOrder node, where the purchaseOrder node contains an Address node, where the Address node contains a comment node, and where the comment node is associated with a text value that includes the words "beaches" and "whales" or "giraffes."

The query of Example 3 may be transformed into the following object-relational query:

EXAMPLE 4

```
SELECT ID
FROM PURCHASE_ORDERS_xmltype
WHERE XCONTAINS(DOC.ADDRESS.COMMENT, '$ beaches and whales OR giraffes) > 0;
```

As those skilled in the art shall appreciate, the execution of the transformed query of Example 4 performs the same search specified the original query of Example 3; however, the embedded XML expression contained within the database command of Example 3 has been transformed into a full-text function as shown in the database command of Example 4. Furthermore, if an index is defined on the column identified by "DOC.ADDRESS.COMMENT," then the full-text function shown in Example 4 will be evaluated using the index.

Transforming Embedded XML Expressions Using the Contains SQL Function

Under certain circumstances, the XML query functions, such as the nsp:contains function, can be transformed into the CONTAINS SQL function. Those circumstances include the condition that the first argument of the nsp:contains function is either a single text node whose parent node maps to (a) a single column or to (b) an attribute that maps to a single column. In both cases, the single column is a single relational column, either in a nested table or the main table itself.

In one embodiment, XML query functions, such as the nsp:contains function, are only transformed into the CONTAINS SQL function if a text index exists over the column. In an embodiment of the invention, the text index is implemented using the ConText index feature of Oracle 10 g, available from Oracle Corporation of Redwoods Shores, Calif. If the necessary conditions are satisfied, then the XML query function can be rewritten into the CONTAINS SQL function.

Consider the following illustrative query containing a XML query language expression:

EXAMPLE 5

```
SELECT ID
FROM PURCHASE_ORDERS_xmltype
WHERE existsNode( DOC,
'/purchaseOrder/Address/comment[nsp:contains(text( ),
"$beaches and whales OR giraffes")>0]',
'xmlns:nsp="http://xmlns.company.com/xdb"' ) = 1 ;
```

The query of Example 5, when executed, returns data from the ID column of the database object PURCHASE_ORDERS_xmltype for those records that match the specified search condition. In this case, any record that satisfies the search condition is a XML document that contains a hierarchy of nodes that includes a purcharseOrder node, where the purchaseOrder node contains an Address node, where the Address node contains a comment node, and where the comment node is associated with a text value that includes the words "beaches" and "whales" or "giraffes."

The query of Example 5 may be transformed into the following object-relational query:

EXAMPLE 6

```
SELECT ID
FROM PURCHASE_ORDERS_xmltype
WHERE CONTAINS(DOC.ADDRESS.COMMENT, '$beaches and whales or giraffes') > 0;
```

The execution of the transformed query of Example 6 performs the same search specified the original query of Example 5. As the conditions discussed above were satisfied by the query of Example 5, the query of Example 5 was transformed into an object-relational query that contains the CONTAINS SQL function.

Policy Restrictions

Other restrictions regarding when the rewrite of XML query functions, such as the nsp:contains function, can be performed may exist in certain embodiments of the invention. For example, the rewrite of the nsp:contains function may not be possible if the first argument of the nsp:contains function does not map or correspond to a single relational column.

In an embodiment, in order to use an index, a determination must be made whether the properties of the index conflict with the properties of the embedded XML expression. The index may only be used if the properties of the index do not conflict with the properties of the embedded XML expression to ensure that the nature of the text search is not altered when the original nsp:contains function is rewritten. For example, the policy of the nsp:contains function contained in the embedded XML function might specify a case-insensitive search while the policy for the text index might specify a case-sensitive search. In such a case, the nsp:contains function cannot be rewritten using the text index without the nature of the search being altered, since the original search was case-insensitive. In this example, the nsp:contains function could not use the index having a case-sensitive policy. In another example, an XML query function may only use an index if the policy of the index and the policy of the XML query function treat the amount of whitespace in the same manner.

Transforming Database Commands Using an Intermediate Step

Embodiments of the invention described herein transform a nsp:contains function, embedded within a database command, into the SQL contains function or the SQL xcontains function. Some embodiments of the invention may perform this transformation using an intermediate step. For example, in an embodiment of the invention, the nsp:contains function is first transformed into an intermediate function (such as the XML_CONTAINS function supported by Oracle 10 G, available from Oracle Corporation, Redwood Shores, Calif.), and thereafter the intermediate function is transformed into the SQL contains function or the SQL xcontains function as described above.

Using an Index at a Level Higher than the Level Associated with the Column Referenced in the Embedded XML Expression Assuming that an index exists on any column referenced in the path of the XML data identified in the embedded XML expression, the index may be used when transforming the embedded XML expression to a full-text function, even if the index is defined on a column at a higher level than a column storing data satisfying all the search criteria of the embedded XML expression. In other words, the full-text function, created as a result of transforming the embedded XML expression, may include a reference to the index to identify a set of data, and the set of data identified by the index may include all the rows that satisfies the search criteria contained in the embedded XML expression, but the set of data may also contain additional rows that does not satisfy the search criteria contained in the embedded XML expression. In this way, the index may be used as a primary filter, which is explained in further detail below.

To illustrate, the database command of Example 5 contains an embedded XML expression that references a column associated with the comment node. Assume that the comment node is a level under the address node. If an index exists on the column associated with the address node, the query of Example 5 may be transformed as shown below in Example 7.

EXAMPLE 7

```
SELECT ID
FROM PURCHASE_ORDERS_xmltype
WHERE CONTAINS(DOC.ADDRESS, '$beaches and whales OR
   giraffes') > 0
AND existsNode( DOC,
   '/purchaseOrder/Address/comment[nsp:contains(text( ),
      "$beaches and whales OR giraffes")>0]',
      'xmlns:nsp="http://xmlns.company.com/xdb"' ) = 1 ;
```

Note that in the query of Example 7, XCONTAINS is over the column associated with DOC.ADDRESS. Since the address node is a level higher than the comment node, the result set obtained by executing the CONTAINS clause of Example 7 will contain all the rows satisfying the embedded XML expression of Example 5, in addition to other rows that does not satisfy the embedded XML expression of Example 5. As a result, it is necessary to include the existNode function in the database command of Example 7 to further identify those rows that satisfy the full search criteria specified in the original query.

To minimize the amount of rows in the result set against which the existsNode function will be executed against, it is advantageous to reference the index that is defined on a particular column referenced in the path of the XML data identified in the XML expression, where the particular column is nearest, in the path specified in the XML query expression, to the column storing data satisfying search criteria of the embedded XML expression. Thus, when transforming the XML expression to a full-text function, embodiments of the invention may (a) determine the index ("the nearest index"), if any, that is defined on a column referenced in the path of the XML data identified in the XML expression, that is nearest the column storing data satisfying search criteria of the embedded XML expression, and (b) reference the nearest index in the full-text function when transforming the XML query expression in the database command.

Primary Filtering

As an orthogonal performance improvement, during step 230, in some circumstances, embodiments of the invention may advantageously rewrite the database command to additionally recite a database function, wherein, upon executing the database command, the database function acts as a primary filter. Primary filters may be used regardless of whether the original query is a text query. For ease of explanation, embodiments of the invention shall be explained with reference to using a primary filter in conjunction with text queries; however, the primary filters may be used with a variety of original queries, including those that are not text based. As explained below, an index may be used by the primary filter, but an index is not necessary to define a primary filter.

In an embodiment, in step 230, the embedded XML expression is transformed within a database command to full-text function that employs a primary filter. A primary filter may allow the database command to be executed faster than if the database command did not employ the primary filter. A primary filter is a set of conditions that are broader than the set of search criteria identified in the database command. Thus, any record that satisfies the database command must also satisfy the primary filter. In executing a database command that employs a primary filter, a set of records are generated that satisfy the primary filter, and then the rest of the search criteria specified in the database command are applied against those set of records, thereby greatly minimizing the amount of records that need to checked to see if they match the search criteria.

In an embodiment, to employ a primary filter in the performance of step 230, a text index is defined on a column referenced in the embedded XML expression. During the performance of step 230, the greatest prefix (or portion) of the XPath or XQuery query that can be rewritten into relational form using the text index is identified. The identified portion of the XPath or XQuery query is rewritten in relational form to operate as a primary filter.

The XML query language command can be rewritten using operators of the text index so as to use the text index as a primary filter. In the discussion below, a ConText index shall be discussed to illustrate using a primary index in step 230; however, other embodiments of the invention may use other types of text indexes in the performance of employing a primary filter.

In an embodiment, ConText operators, such as WITHIN and INPATH, may be used in the performance of step 230 to transform the database command of step 220 to a database command that employs a primary filter. Any type of operator that is related to document sectioning may be used to recite a full-text function that employs a primary filter. Thus, while certain examples shall be discussed below with reference to the WITHIN and INPATH operators, other operators may be used to transform the database command of step 220 to a database command that employs a primary filter.

In the embodiments discussed below, the ConText operators WITHIN and INPATH take a Text Path as argument, as opposed to an XPath. Text Path is a subset of the XPath language. The use of the WITHIN and INPATH ConText operators shall be discussed in further detail below.

INPATH Operator

The INPATH operator may be used to express full-text searching using a Text Path argument. If the input XPath query (a) includes a XML query predicate (for example, a nsp:contains predicate) nested inside a Text Path query, and (b) uses an existsNode function, then the existsNode function may be rewritten using a SQL function, such as a CONTAINS function, as a primary filter. The CONTAINS primary filter clause may be added if there exists a ConText index at any level above the level at which the XML query predicate is applied.

Consider the following illustrative query:

EXAMPLE 8

```
SELECT ID
FROM PURCHASE_ORDERS_xmltype
WHERE existsNode( DOC,
    '/purchaseOrder/Address/comment[nsp:contains(text( ),
        "electric")>0]/commentauthor',
    'xmlns:nsp="http://xmlns.company.com/xdb"' ) = 1 ;
```

The query of Example 8, when executed, returns data from the ID column of the database object PURCHASE_ORDERS_xmltype for those records that match the specified search condition. In this case, any record that satisfies the search condition is a XML document that contains a hierarchy of nodes that includes a purcharseOrder node, where the purchaseOrder node contains an Address node, where the Address node contains a comment node, and where the comment node (a) is associated with a text value that includes the words "electric" and (b) contains a commentauthor node.

The query of Example 8 may be rewritten as shown in Example 9:

EXAMPLE 9

```
SELECT ID
FROM PURCHASE_ORDERS_xmltype d
WHERE CONTAINS(d.DOC, 'electric INPATH
    (/purchaseOrder/Address/comment)')>0 AND
    existsNode( DOC,
        '/purchaseOrder/Address/comment[nsp:contains(text( ),
            "electric")>0]/commentauthor',
    'xmlns:nsp="http://xmlns.company.com/xdb"' ) = 1 ;
```

As shown above, the database command of Example 8 has been rewritten in Example 9 to include a primary filter, namely the CONTAINS clause, as the conditions for using a primary filter were satisfied.

If the CONTAINS clause is sufficient to satisfy the existsNode function, then the existsNode function can be removed, leaving only the CONTAINS clause. Consider the following illustrative query:

EXAMPLE 10

```
SELECT ID
FROM PURCHASE_ORDERS_xmltype
WHERE existsNode( DOC,
    '/purchaseOrder/Address/comment[nsp:contains(text( ),
        "electric")>0]', 'xmlns:nsp="http://xmlns.company.com/xdb"' ) = 1 ;
```

The query of Example 10, when executed, returns data from the ID column of the database object PURCHASE_ORDERS_xmltype for those records that match the specified search condition. In this case, any record that satisfies the search condition is a XML document that contains a hierarchy of nodes that includes a purcharseOrder node, where the purchaseOrder node contains an Address node, where the Address node contains a comment node, and where the comment node is associated with a text value that includes the word "electric."

The query of Example 10 may be rewritten as shown in Example 11:

EXAMPLE 11

```
SELECT ID
FROM PURCHASE_ORDERS_xmltype d
WHERE CONTAINS(d.DOC, 'electric INPATH
    (/purchaseOrder/Address/comment)')>0;
```

In the query of Example 10, any record that satisfied the existsNode clause will satisfy the CONTAINS clause; consequently, the existsNode clause is not necessary, and it may be removed when the query is rewritten as shown in Example 11.

WITHIN Operator

The WITHIN operator restricts a query to a specified section in the XML document. If the input XPath query is an XML query predicate (for example, a nsp:contains function)

nested inside a descendant lookup query, and the XPath query uses an existsNode function, then the existsNode function may be rewritten using a SQL function, such as a CONTAINS function, as a primary filter. The CONTAINS primary filter clause may be added if there exists a ConText index at any level above the level at which the nsp:contains clause is applied.

Consider the following illustrative query:

EXAMPLE 12

SELECT ID
FROM PURCHASE_ORDERS_xmltype
WHERE existsNode( DOC, '//purchaseOrder [nsp:contains(text( ),
    "electric")>0]/commentauthor',
  'xmlns:nsp="http://xmlns.company.com/xdb"' ) = 1 ;

The query of Example 12, when executed, returns data from the ID column of the database object PURCHASE_ORDERS_xmltype for those records that match the specified search condition. In this case, any record that satisfies the search condition is a XML document that contains a hierarchy of nodes that includes a purcharseOrder node, where the purchaseOrder node (a) is associated with a text value that includes the word "electric" and (b) contains a commentauthor node.

The query of Example 12 may be rewritten as shown in Example 13:

EXAMPLE 13

SELECT ID
FROM PURCHASE_ORDERS_xmltype d
WHERE CONTAINS(d.DOC, 'electric WITHIN purchaseOrder')>0 AND
existsNode( DOC, '//purchaseOrder [nsp:contains(text( ),
    "electric")>0]/commentauthor',
  'xmlns:nsp="http://xmlns.company.com/xdb"' ) = 1 ;

The CONTAINS primary filter clause is added in the rewritten query of Example 13 as a ConText index existed at a level above the level at which the nsp:contains clause is applied.

If the CONTAINS clause is sufficient to satisfy the existsNode function, then the existsNode function can be removed, leaving only the CONTAINS clause. Consider the following illustrative query:

EXAMPLE 14

SELECT ID
FROM PURCHASE_ORDERS_xmltype
WHERE existsNode( DOC, '//purchaseOrder [nsp:contains(text( ),
    "electric")>0]', 'xmlns:nsp="http://xmlns.company.com/xdb"' ) = 1 ;

The query of Example 14, when executed, returns data from the ID column of the database object PURCHASE_ORDERS_xmltype for those records that match the specified search condition. In this case, any record that satisfies the search condition is a XML document that contains a hierarchy of nodes that includes a purcharseOrder node, where the purchaseOrder node is associated with a text value that includes the word "electric."

The query of Example 14 may be rewritten as shown in Example 15:

EXAMPLE 15

SELECT ID
FROM PURCHASE_ORDERS_xmltype d
WHERE CONTAINS(d.DOC, 'electric WITHIN purchaseOrder')>0;

As shown in the rewritten query of Example 15, the existsNode function is removed, leaving only the CONTAINS clause, as the CONTAINS clause is sufficient to satisfy the removed existsNode function.

Embodiments of the invention advantageously enable clients to retrieve XML documents stored in a database by transmitting XML query language commands to a DBMS. A database server may transform the received command to a database command to facilitate its execution. A text index is not necessary to perform full-text searching, although using a text index allows, in some circumstances, the text index to be used as a primary filter, thereby improving the performance of the system. A primary filter may also be recited without the use of an index; thus, embodiments of the invention may use primary filtering without an index being defined.

Transformed Embedded XML Expressions may be
of a Variety of Formats

It should be noted that, as evidenced in the above examples, the embedded XML expressions transformed in step 230 may be of a variety of formats. For example, embedded XML expressions need not have any specific XML function, such as nsp:contains. Thus, even though embodiments of the invention have been described above with reference to examples which feature a XPath function entitled nsp:contains or an XQuery function entitled nsp:contains in an embedded XML expression, the embedded XML expression need not include the nsp:contains function. Consider the following examples:

EXAMPLE 16

SELECT ID
FROM PURCHASE_ORDERS_xmltype
WHERE existsNode (DOC, '/purchaseOrder/Address[comment=
    "electric"]') =1;

The above query, which does not contain the nsp:contains function, may be transformed in step 230 as shown below in Example 17.

EXAMPLE 17

SELECT ID
FROM PURCHASE_ORDERS_xmltype d
WHERE CONTAINS (d.DOC, 'electric INPATH
(/purchaseOrder/Address/comment)')>0 AND -continued

```
existsNode (DOC, '/purchaseOrder/Address[comment=
   "electric"]') =1;
```

The transformed query of Example 17, when executed, uses a primary index, even though the original query of Example 16 does not contain the nsp:contains function. Thus, the techniques disclosed herein may be abstracted for use with a variety of embedded XML expressions, and do not rely on the presence of a particular XML function, such as the nsp:contains function, in the original query. After the transformation of the embedded XML expression in step 230, processing proceeds to step 240.

Execution of the Transformed Database Command

In step 240, after the embedded XML expression within the database command has been transformed into a full-text function, the database command is executed by database server 122 to retrieve data from database 124 based on the path and the search criteria specified in the full-text function. The retrieved data corresponds to the XML documents, stored in database 124, that satisfy the set of search criteria specify in the original database command received in step 220. The XML documents retrieved by the database server 122 may thereafter be sent to the client 110. Advantageously, DBMS 120 may take advantage of the efficiencies in storing XML data within database 124, while avoiding the generation of unnecessary XML elements when the XML elements that contribute nothing to the outcome of processing the database command received in step 220.

Implementing Mechanisms

Figure 3:
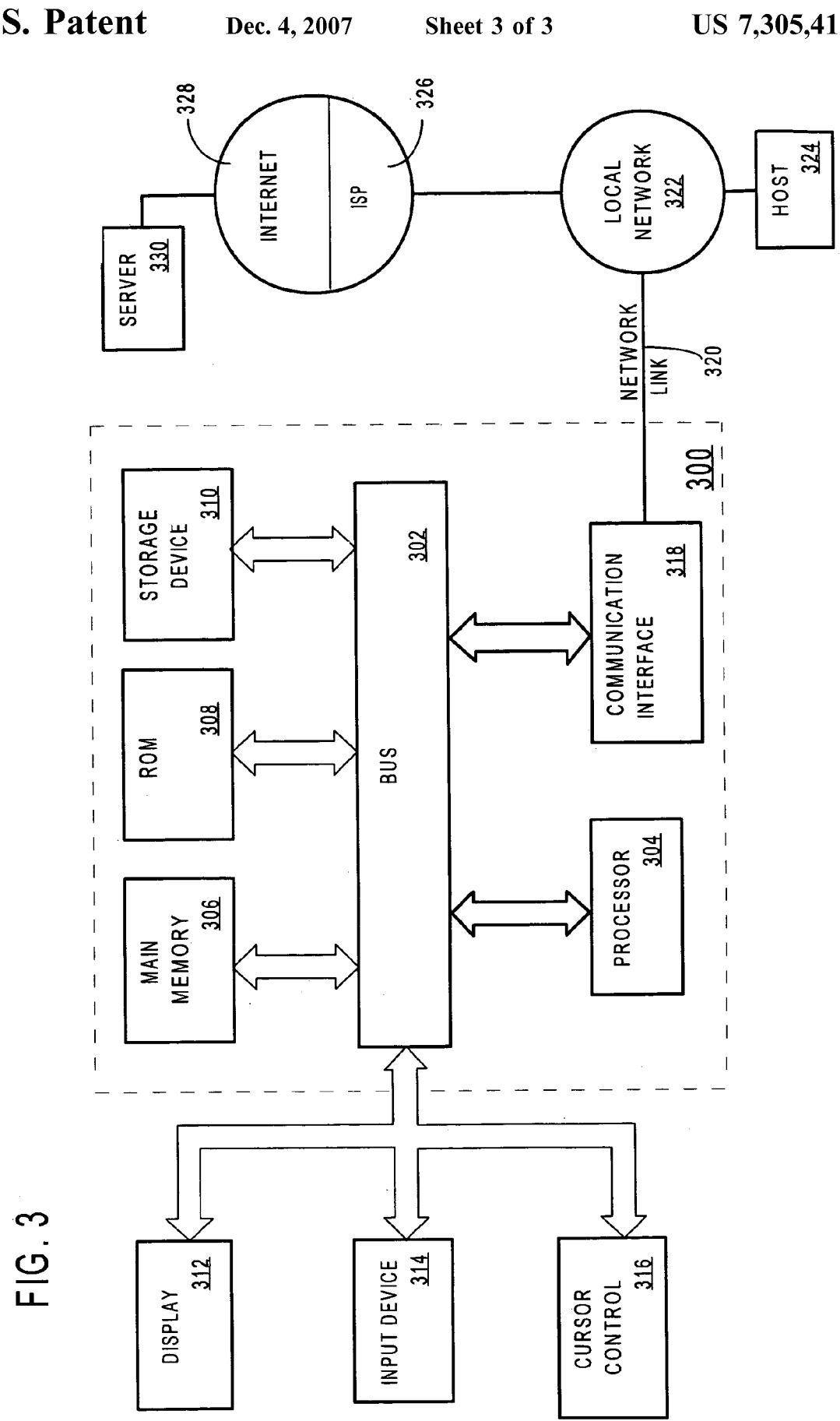
FIG. 3 is a block diagram that illustrates a computer system upon which an embodiment of the invention may be implemented.

A client, a database server, and a database may each be implemented on a computer system according to an embodiment of the invention. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising the steps of:
   storing, within one or more structures of a database, data for an XML document;
   receiving a database command with an embedded XML query expression, wherein the embedded XML query expression specifies (a) a path that identifies one or more locations within the structure of the XML document, and (b) text search criteria for filtering the one or more locations based on content contained within the one or more locations;
   determining whether an index should be used as a primary filter;
   upon determination that a set of conditions is satisfied, transforming, within the database command, the embedded XML query expression into a rewritten expression that includes a text function, wherein the text function specifies the path and the text search criteria, and wherein the text function includes a reference to the index if it was determined that the index should be used; and
   executing the database command to retrieve data from the one or more structures based on the path and the text search criteria specified in the rewritten expression.

2. The method of claim 1, wherein the rewritten expression consists of the text function.

3. The method of claim 1, wherein the step of determining whether the index should be used as a primary filter is performed based on cost-based or rule-based analysis.

4. The method of claim 3, wherein, based on the cost-based or rule-based analysis, the index is defined on a first column, wherein a second column stores data corresponding to content contained within the one or more locations identified by the path, and wherein the first column is the nearest column to the second column in the path upon which an index is defined.

5. The method of claim 1, wherein the embedded XML query expression is specified using, at least in part, XPath or XQuery.

6. The method of claim 1, wherein determining that the set of conditions is satisfied comprises the step of:
   determining whether the properties of the index conflict with the properties of the embedded XML query expression.

7. The method of claim 1, wherein determining that the set of conditions is satisfied comprises the step of:
   determining, based on cost-based or rule-based analysis, that the embedded XML query expression should be transformed into the text function.

8. The method of claim 1, wherein the text function is evaluated by functional evaluation.

9. The method of claim 1, wherein the text function is evaluated using the index.

10. A machine-implemented method, comprising the steps of:
    storing, within one or more structures of a database, data for an XML document;
    receiving a database command with an embedded XML query expression, wherein the embedded XML query expression specifies (a) a path that identifies one or more locations within the structure of the XML document, and (b) search criteria for filtering the one or more locations based on content contained within the one or more locations;
    upon determination that a set of conditions is satisfied, rewriting the database command to additionally recite a database function, wherein, upon executing the database command, the database function acts as a primary filter;
    executing a first portion of the database command to retrieve, from the one or more structures, a first data set, wherein the first portion includes the database function; and
    executing a second portion of the database command, against the first data set, to identify data within the first data set that satisfies the search criteria specified in the embedded XML query expression, wherein the second portion includes the embedded XML query expression.

11. The method of claim 10, wherein the database function references a first set of nodes, wherein the embedded XML query expression references a second set of nodes, and wherein the first set of nodes corresponds to a hierarchy level higher than the second set of nodes.

12. The method of claim 10, wherein the database function is an operator related to document sectioning.

13. The method of claim 12, wherein the operator is either the WITHIN operator or the INPATH operator.

14. The method of claim 10, wherein the text function is evaluated using a text index defined upon a column storing data identified by the embedded XML query expression.

15. A machine-readable medium carrying one or more sequences of instructions, wherein execution of the one or more sequences of instructions by one or more processors causes the one or more processors to perform the steps of:
- storing, within one or more structures of a database, data for an XML document;
- receiving a database command with an embedded XML query expression, wherein the embedded XML query expression specifies (a) a path that identifies one or more locations within the structure of the XML document, and (b) text search criteria for filtering the one or more locations based on content contained within the one or more locations;
- determining whether an index should be used as a primary filter;
- upon determination that a set of conditions is satisfied, transforming, within the database command, the embedded XML query expression into a rewritten expression that includes a text function, wherein the text function specifies the path and the text search criteria, and wherein the text function includes a reference to the index if it was determined that the index should be used; and
- executing the database command to retrieve data from the one or more structures based on the path and the text search criteria specified in the rewritten expression.

16. The machine-readable medium of claim 15, wherein the rewritten expression consists of the text function.

17. The machine-readable medium of claim 15, wherein the step of determining whether the index should be used as a primary filter is performed based on cost-based or rule-based analysis.

18. The machine-readable medium of claim 17, wherein, based on the cost-based or rule-based analysis, the index is defined on a first column, wherein a second column stores data corresponding to content contained within the one or more locations identified by the path, and wherein the first column is the nearest column to the second column in the path upon which an index is defined.

19. The machine-readable medium of claim 15, wherein the embedded XML query expression is specified using, at least in part, XPath or XQuery.

20. The machine-readable medium of claim 15, wherein determining that the set of conditions is satisfied comprises the step of:
- determining whether the properties of the index conflict with the properties of the embedded XML query expression.

21. The machine-readable medium of claim 15, wherein determining that the set of conditions is satisfied comprises the step of:
- determining, based on cost-based or rule-based analysis, that the embedded XML query expression should be transformed into the text function.

22. The machine-readable medium of claim 15, wherein the text function is evaluated by functional evaluation.

23. The machine-readable medium of claim 15, wherein the text function is evaluated using the index.

24. A machine-readable medium carrying one or more sequences of instructions, wherein execution of the one or more sequences of instructions by one or more processors causes the one or more processors to perform the steps of:
- storing, within one or more structures of a database, data for an XML document;
- receiving a database command with an embedded XML query expression, wherein the embedded XML query expression specifies (a) a path that identifies one or more locations within the structure of the XML document, and (b) search criteria for filtering the one or more locations based on content contained within the one or more locations;
- upon determination that a set of conditions is satisfied, rewriting the database command to additionally recite a database function, wherein, upon executing the database command, the database function acts as a primary filter;
- executing a first portion of the database command to retrieve, from the one or more structures, a first data set, wherein the first portion includes the database function; and
- executing a second portion of the database command, against the first data set, to identify data within the first data set that satisfies the search criteria specified in the embedded XML query expression, wherein the second portion includes the embedded XML query expression.

25. The machine-readable medium of claim 24, wherein the database function references a first set of nodes, wherein the embedded XML query expression references a second set of nodes, and wherein the first set of nodes corresponds to a hierarchy level higher than the second set of nodes.

26. The machine-readable medium of claim 24, wherein the database function is an operator related to document sectioning.

27. The machine-readable medium of claim 26, wherein the operator is either the WITHIN operator or the INPATH operator.

28. The machine-readable medium of claim 24, wherein the text function is evaluated using a text index defined upon a column storing data identified by the embedded XML query expression.

* * * * *

UNITED STATES PATENT AND TRADEMARK OFFICE
CERTIFICATE OF CORRECTION

| | | |
|---|---|---|
| PATENT NO. | : 7,305,414 B2 | |
| APPLICATION NO. | : 11/099918 | |
| DATED | : December 4, 2007 | |
| INVENTOR(S) | : Manikutty et al. | |

It is certified that error appears in the above-identified patent and that said Letters Patent is hereby corrected as shown below:

On the Title Page Item -56-, under "Other Publications", line 1, delete "2005" and insert -- 2004 --, therefor.

On the Title Page Item -56- page 2, under "Other Publications", line 24, after "146" delete "," and insert -- . --, therefor.

In column 4, line 1, delete "10 g" and insert -- 10g --, therefor.

In column 5, line 61, delete "Xpath" and insert -- XPath --, therefor.

In column 6, line 36, delete "0)'," and insert -- 0]', --, therefor.

In column 8, line 12, delete "expresssion" and insert -- expression --, therefor.

In column 9, line 20, delete "purcharseOrder" and insert -- purchaseOrder --, therefor.

In column 9, line 63, delete "10 g" and insert -- 10g --, therefor.

In column 10, line 20, delete "purcharseOrder" and insert -- purchaseOrder --, therefor.

In column 11, line 17, delete "10 G" and insert -- 10G --, therefor.

In column 12, line 4, delete "existNode" and insert -- existsNode --, therefor.

In column 13, line 61, delete "purcharseOrder" and insert -- purchaseOrder --, therefor.

In column 14, line 41, delete "purcharseOrder" and insert -- purchaseOrder --, therefor.

UNITED STATES PATENT AND TRADEMARK OFFICE
CERTIFICATE OF CORRECTION

PATENT NO.         : 7,305,414 B2
APPLICATION NO.    : 11/099918
DATED              : December 4, 2007
INVENTOR(S)        : Manikutty et al.

It is certified that error appears in the above-identified patent and that said Letters Patent is hereby corrected as shown below:

In column 15, line 25, delete "purcharseOrder" and insert -- purchaseOrder --, therefor.

In column 15, line 67, delete "purcharseOrder" and insert -- purchaseOrder --, therefor.

Signed and Sealed this

Nineteenth Day of August, 2008

JON W. DUDAS
*Director of the United States Patent and Trademark Office*